WILLIAM H. GARDNER
DONALD H. GRAHAM
INVENTORS

United States Patent Office 3,736,111
Patented May 29, 1973

3,736,111
PROCESS AND APPARATUS FOR THE COMPLETE RECLAMATION OF VALUABLE PRODUCTS FROM SOLID WASTE
William H. Gardner, Newark, Del., and Donald H. Graham, Fort Ashby, W. Va., assignors to Hercules Incorporated, Wilmington, Del.
Filed May 17, 1971, Ser. No. 144,170
Int. Cl. C05f 9/00; C10b 57/00; C10j 3/00
U.S. Cl. 48—111                                    6 Claims

ABSTRACT OF THE DISCLOSURE

A process for recovery of valuable products from domestic refuse is provided. Domestic refuse is subjected to aerobic digestion. A crude humus product containing non-digestible materials is recovered. The crude humus is separated into a humus product and non-digestible materials. The non-digestible materials are pyrolyzed to produce valuable oils and gases. Industrial refuse can be pyrolyzed with the non-digestible material derived from domestic refuse.

---

This invention relates to a process for the complete reclamation of valuable products from solid waste.

Estimates from current studies indicate that about 190 million tons of solid refuse is being collected each year. The disposal of this waste matter is becoming a more critical problem each year. The only satisfactory long range solution to the disposal of solid waste is through reclamation of valuable products for reuse. It is, therefore, imperative that systems and processes be developed to reclaim as many basic materials as possible from domestic and industrial refuse.

Accordingly, it is the object of this invention to provide an economical and efficient process for reclamation of useful products from domestic type solid refuse.

Another object of this invention is to provide a system for the complete reclamation of valuable products from both industrial and domestic refuse.

Other objects of this invention will, in part, be obvious and will, in part, appear hereinafter. For a complete understanding of the nature and objects of this invention, reference is made to the drawings and detailed description which follows.

In the drawings, FIG. 1 is a process flow diagram for the domestic and industrial solid waste reclamation process of this invention.

Figure 1:
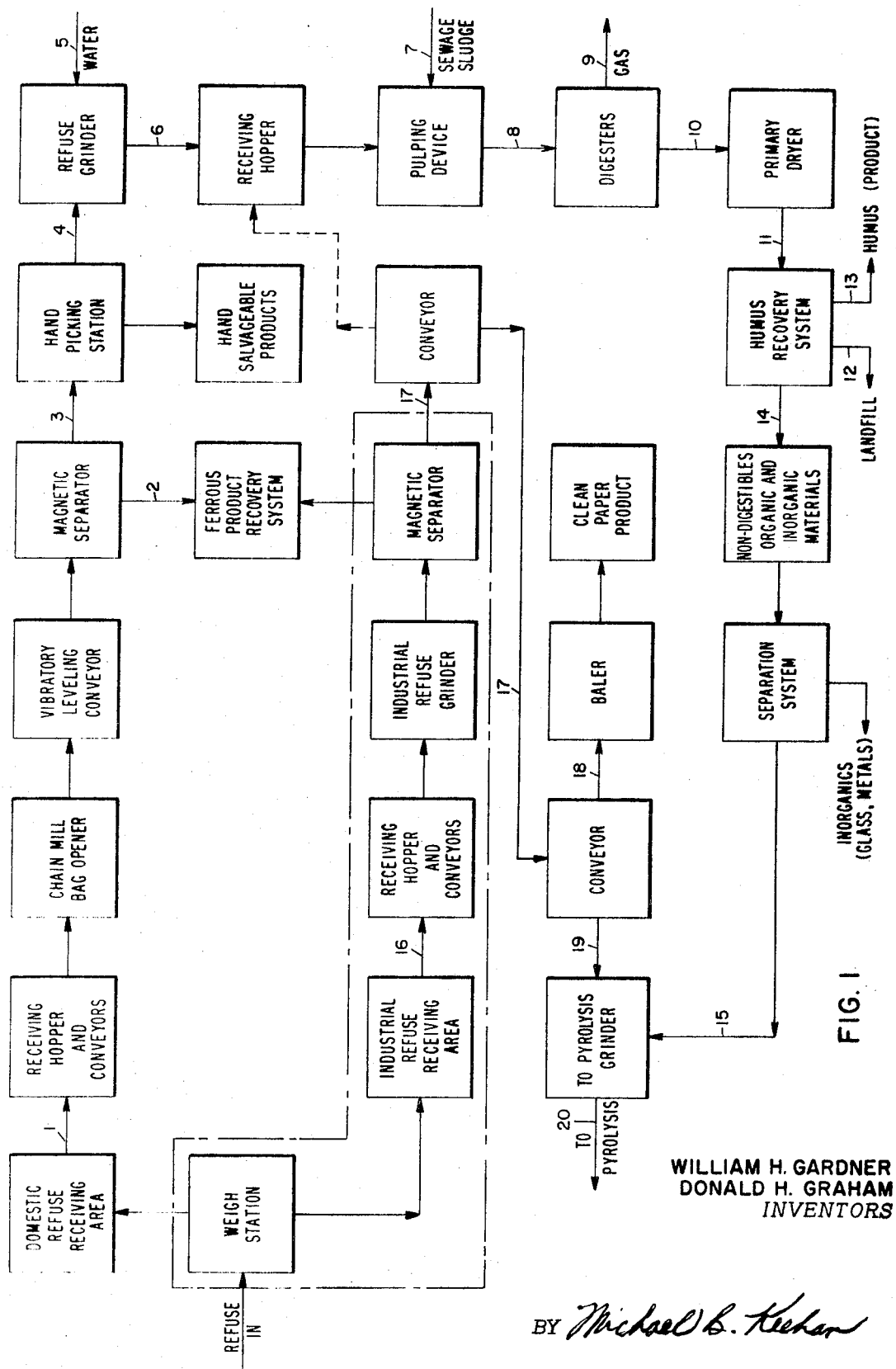

In the drawings, like numbers refer to like parts where applicable. A material balance of the process feed streams is set forth in Table 1A and 1B. The material balance is based on an average daily estimate of solid waste being reclaimed in the process of this invention.

As illustrated in the flow diagram of FIG. 1, incoming refuse is taken to a weigh station. Domestic refuse 1 is taken to a receiving area where it is unloaded from trucks into receiving hoppers. Domestic refuse 1 is conveyed to a flailing mill or chain mill. The flailing or chain mill is employed to open bags, cartons and the like, and the opened refuse is conveyed to a vibrating conveyor where it is vibrated, leveled and passed through a magnetic separator in which ferrous metals 2 are removed from the domestic refuse and the ferrous metals 2 recovered. After removal of ferrous metals 2, the resulting domestic refuse feed 3 is conveyed past a hand picking station where items of salvageable value are removed from the feed. The resulting domestic refuse feed 4 is passed into a refuse grinder in which the refuse is ground and wetted with water 5 in controlled amounts. The ground wetted refuse 6 is conveyed to a receiving hopper and then to a pulping device in which digested sanitary sewage sludge 7 is admixed with the wetted refuse 6, the refuse is pulped and resulting admixture comprises the feed 8 for an aerobic digestor, said feed 8 containing between about 50% and 65% by weight of water. The digestor feed 8 is continuously added to an aerobic digestor. A particularly suitable aerobic digestor unit is described in detail in U.S. 3,114,622, reference to which is hereby made. The output from the aerobic digestor comprises gases 9 and a crude humus 10 comprising an intimate admixture of compost and non-digestible waste materials comprising plastics, unremoved ferrous metals, non-ferrous metals, rubber, leather and the like. This crude humus 10 is passed through a drier and the resulting product 11 is separated into a humus product 13, land fill 12 and non-digestible solid waste 14. The non-digestible solid waste 14 is further classified by passing this solid waste through various separators and classifiers wherein additional ferrous metals, non-ferrous metals and glass not previously removed are separated from the non-digestible solid waste 14. The remaining solid waste material 15 predominantly comprising organic non-digestibles is then conveyed to a pyrolysis grinder unit, if needed, and then to a pyrolysis furnace wherein the non-digestible organic material 15 is pyrolyzed. The pyrolysis section process flow is more precisely described in FIG. 2.

In FIG. 1 a second process flow section for use for reclamation of products from industrial wastes is shown within the phantom line. The term industrial refuse as it is used herein is meant to include refuse which does not contain any substantial quantity of digestible organic material. Industrial refuse is taken to the weighing station and then moved to an industrial waste receiving area. The industrial refuse feed 16 is loaded into hoppers and then conveyed from the hoppers into an industrial refuse grinder. After grinding the industrial refuse feed 16 is passed through a magnetic separator in which ferrous metals are removed from the industrial refuse feed 16. The resulting feed 17 is then conveyed to the pyrolysis section. The composition of feed 17 is based on an average daily operation. Generally, however, this refuse will be pre-separated, for example, into all paper refuse, or all plastic and rubber refuse. If an increment of feed 17 is essentially all paper, then it is diverted to baler and baled 18. If the feed is predominantly plastics and rubber 19, it is conveyed to a pyrolysis feed bin.

The process flow section for use with industrial refuse shown within the phantom lines in FIG. 1 is entirely optional. The process of this invention can be operated solely with domestic refuse process as described in FIG. 1.

Figure 2:
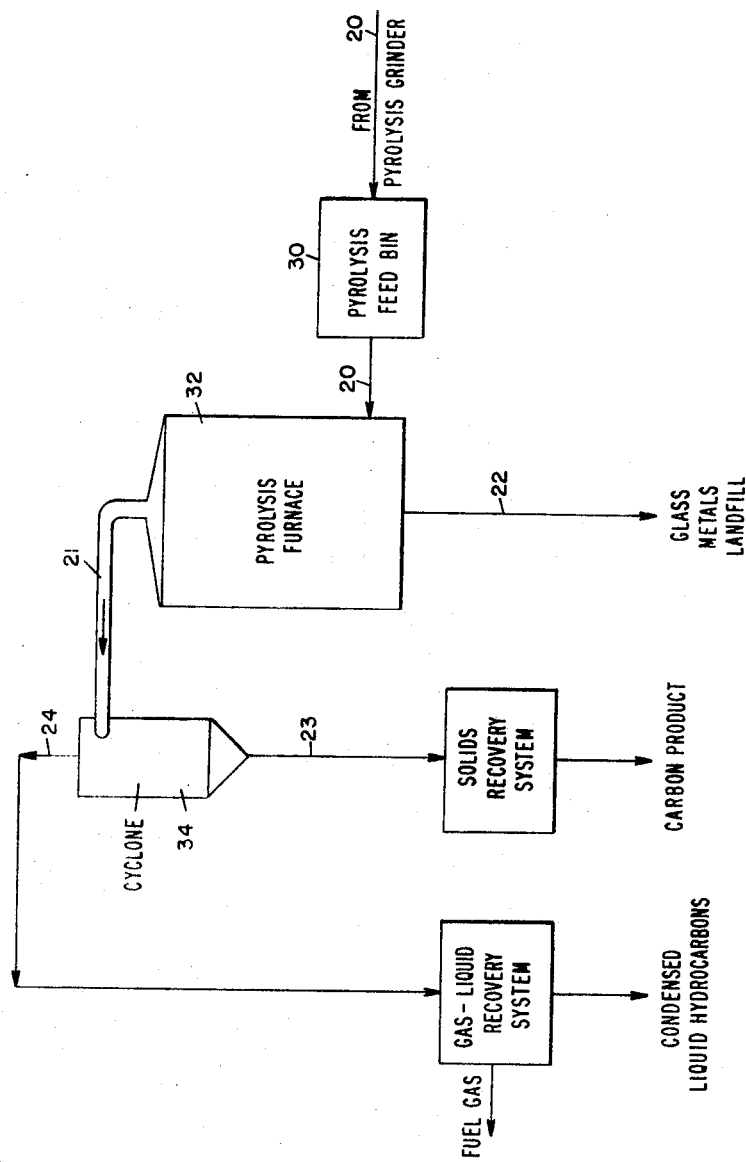
FIG. 2 is a process flow diagram of a pyrolysis section which can be employed in the process of this invention.

In FIG. 2, a flow diagram for a pyrolysis unit for pyrolyzing non-digestible organic material from domestic refuse or from industrial refuse recovered from the process referred to in the description of FIG. 1 above is shown. The feed to the pyrolysis unit can be solely the non-digestible organic materials 15 recovered from aerobic digestion from which ferrous metals have been removed, or alternatively, the feed can be an admixture comprising non-digestible organic materials 15, and industrial refuse 19 comprising plastics and rubber. It is to be understood that the pyrolysis unit can be operated with either refuse 15 or 19 each as a separate source of solid refuse.

In the operation of the pyrolysis section illustrated in FIG. 2, combined solid refuse feed 20 is fed into pyrolysis feed bin 30 prior to being conveyed to a pyrolysis furnace. In the pyrolysis furnace 32 non-digestible organic materials are converted into various products as a result of decomposition of these materials. The pyrolysis furnace 32 can be a fluidized bed furnace in which sand or some other granular and inert type of material is employed as a heat transfer medium. During operation, refuse feed 20 in feed bin 30 is fed into the bottom of the pyrolysis furnace 32. The pyrolysis furnace feed 20 is pyrolyzed in furnace 32 into an overhead product 21 comprising water, carbon, gas, and oil and tar. The bottoms product 22 comprises glass, non-ferrous metals and a trace of ferrous metals, which have not previously been removed from feed 20, as well as carbon and grit. The overhead product 21 is passed into a cyclone separator 34 wherein solid particles 23 principally comprising particulate carbon are separated as a bottoms product from the gases 24. The gas stream 24 is passed into a gas-liquid recovery system wherein condensable hydrocarbons, oils and tars are recovered. The gasses which are separated comprising methane, ethane, and the like, can be used as fuel for operation of dryers, for steam generation and the like.

Figure 3:
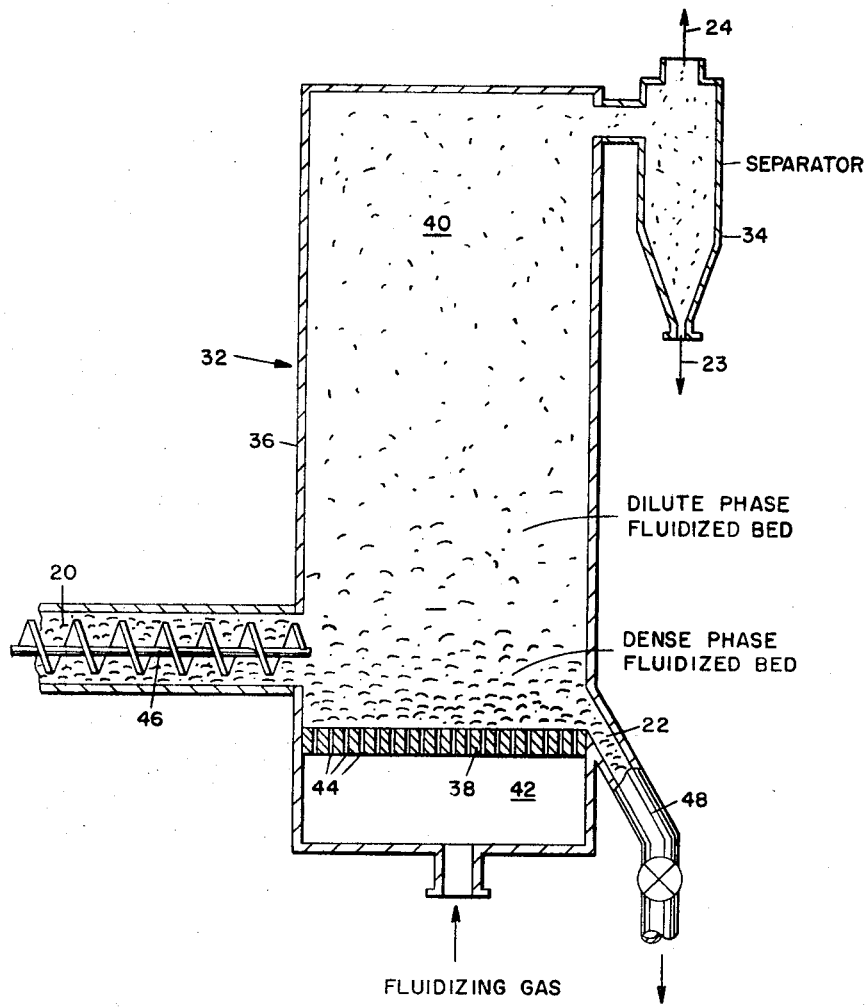
FIG. 3 is a schematic view partly in section of a fluid bed type pyrolysis furnace.

In FIG. 3, a fluidized bed type pyrolysis furnace is schematically illustrated. The furnace 32 is comprised of a reaction vessel 36 having an orifice plate 38 extending across the vessel and dividing the vessel into large upper or reaction section 40 and a lower section 42. Fuidizing gas such as nitrogen which is externally heated is fed into the lower section 42 of the furnace 32 and passes through orifices 44 in orifice plate 38. The fluidizing gas maintains the heat transfer medium such as sand, in a fluidized state such as is shown schematically within furnace section 40. Non-digestible organic feed 20 can be fed by a screw-type conveyor 46 (partially shown only) into the upper section 40 of the furnace 32 directly above orifice plate 38. Heavy solids products which accumulate above orifice plate 38 in the pyrolysis unit are removed periodically via discharge line 48. The pyrolysis furnace described is generally operated at temperatures of from about 1400° F. to about 2000° F. and at pressures of from about 5 p.s.i. to about 25 p.s.i.

domestic refuse feed. It has been found that a refuse feed being digested for compost should have an optimum carbon to nitrogen ratio, C/N, of between about 30 and 50 to produce the best product for soil conditioning or fertilizer purposes. Most domestic refuse in the United States has a high C/N ratio due to the large amount of paper in the waste. Sanitary sewage sludge having a C/N ratio about 12 to 15 is particularly suitable for addition to solid waste feed to reduce the C/N ratio of the feed to the aerobic digestor to the optimum range. Addition of sewage sludge while generally preferred, is optional. Separation of paper prior to aerobic digestion has been found to be difficult and often times results in paper having an unsatisfactory quality for reuse or reclamation because of contamination. This problem is eliminated by reclaiming solid wastes in accordance with the process of this invention. In operaton of the process of this invention, the water content of the solid waste feed to the aerobic digestor should contain between about 50% and about 65% by weight of water. Water can be admixed with the feed in the grinding apparatus or in the pulping apparatus prior to digestion, or water can be added in both processing steps if desired. Sanitary sewage sludge is employed with water to adjust the overall water content of the solid waste feed to the digestor.

The product recovered from the aerogic digestor comprises an admixture of humus, non-digestible organic material, and inorganic material. Separation of this mixture into fractions such as a humus fraction and non-digestible fraction can be accomplished with a series of screens, gravity tables, grinders and associated equipment.

Separation of non-digestible materials from the crude humus product after aerobic digestion has been found to be completely feasible and provides an important advantage in the operation of the process of this invention. The

TABLE 1A

| Feed stream No. | 1 | 3 | 2 | 4 | 5 | 6 | 7 | 8 | 9 | 10 | 11 | 12 |
|---|---|---|---|---|---|---|---|---|---|---|---|---|
| Feed, parts by weight: | | | | | | | | | | | | |
| Paper | 206 | 206 | | 206 | | 206 | | 206 | | () | () | |
| Garbage | 5 | 5 | | 5 | | 5 | | 5 | | () | () | |
| Yard trim | 24 | 24 | | 24 | | 24 | | 24 | | () | () | |
| Dirt | 19 | 19 | | 19 | | 19 | | 19 | | **16 | **16 | 1 |
| Rags | 16 | 16 | | 16 | | 16 | | 16 | | 16 | 16 | |
| Wood | 19 | 19 | | 19 | | 19 | | 19 | | 19 | 19 | |
| Plastics | 7 | 7 | | 7 | | 7 | | 7 | | 7 | 7 | |
| Leather | 2 | 2 | | 2 | | 2 | | 2 | | 2 | 2 | |
| Rubber | 7 | 7 | | 7 | | 7 | | 7 | | 7 | 7 | |
| Glass | 42 | 42 | | 42 | | 42 | | 42 | | 42 | 42 | |
| Ferrous | 31 | 3 | 28 | 3 | | 3 | | 3 | | 3 | 3 | |
| Non-ferrous | 10 | 10 | | 10 | | 10 | | 10 | | 10 | 10 | |
| Water | 97 | 97 | Nil | 97 | 74 | 171 | 207 | 378 | 138 | 240 | 125 | 38 |
| Sanitary sludge | | | | | | | 18 | 18 | | () | () | |
| ** Crude humus | | | | | | | | | 85 | 171 | 171 | 158 |
| Gas | | | | | | | | | | | | |
| Binder, nutrients | | | | | | | | | | | | 4 |

TABLE 1B

| Feed stream No. | 13 | 14 | 15 | 16 | 17 | 18 | 19 | 20 | 21 | 22 | 23 | 24 |
|---|---|---|---|---|---|---|---|---|---|---|---|---|
| Feed, parts by weight: | | | | | | | | | | | | |
| Paper | | | | 5 | 5 | 5 | | | | | | |
| Dirt | 1 | 4 | 4 | | | | | 4 | | | | |
| Rags | | 16 | 16 | | | | | 16 | | | | |
| Wood | | 19 | 19 | | | | | 19 | | | | |
| Plastics | | 7 | 7 | 4 | 4 | | 4 | 11 | | | | |
| Leather | | 2 | 2 | | | | | 2 | | | | |
| Rubber | | 7 | 7 | 3 | 3 | | 3 | 10 | | | | |
| Glass | 2 | 40 | 16 | | | | | 16 | | 16 | | |
| Ferrous | | 3 | | 1.5 | | | | Tr. | | Tr. | | |
| Non-ferrous | | 10 | 2 | .5 | .5 | | .5 | 3 | | 3 | | |
| Water | 1 | 29 | 29 | 1 | 1 | 1 | Tr. | 29 | 57 | | | 57 |
| Humus | 0 | 13 | 13 | | | | | 13 | | | | |
| Carbon | | | | | | | | | 8 | 1 | 8 | |
| Sand | | | | | | | | | 8.1 | 19.5 | 8.1 | |
| Gas | | | | | | | | | 85.3 | | | 85.3 |
| Oil and tars | | | | | | | | | 14.7 | | | 14.7 |
| Grit | | | | | | | | | | 7 | | |

NOTE: Tr.=Trace.

The process of this invention provides a novel method for substantially total reclamation of solid waste materials derived from domestic or industrial refuse. In the process of this invention, a principal product is humus. To maximize the quantity and quality of humus produced, there is essentially no separation of paper in the incoming domestic refuse feed prior to aerobic digestion of the non-digestible materials which are separated from the humus product are subjected to pyrolysis wherein additional valuable products are recovered from this portion of the refuse such as particulate carbon, condensed hydrocarbons, and fuel gas. The condensed hydrocarbons can be refined if desired and recovered. Other valuable oils and tars are also recovered. In addition to these products, glass, ferrous metals and non-ferrous metals are separated from the crude admixture of humus. Each of these products has salvage value. Thus, the process of this invention provides for a maximum reclamation of solids from domestic refuse.

In the process described, a variety of digestors, pyrolysis furnaces, and associated processing equipment can be employed. Thus, for example, pyrolysis can be performed in a multiple hearth raking arm furnace as well as in a fluidized bed furnace described.

The domestic and industrial refuse feed compositions and quantities set forth in Table I are intended to be illustrative only and are included herein by way of illustration and not limitation. It is fully appreciated that domestic refuse content and industrial refuse content will vary seasonally and with the geographic location of a municipality as well as on a day-to-day basis.

What we claim and desire to protect by Letters Patent is:

1. A process for reclamation of useful products from domestic solid refuse comprising paper, garbage, plastics, rubber, glass, ferrous metals, and non-ferrous metals, said process comprising the steps of:
    (a) receiving said domestic solid refuse comprising an admixture of digestible and non-digestible waste,
    (b) shredding the solid refuse,
    (c) passing the solid refuse through a magnetic separator for removal of ferrous metals from said solid refuse,
    (d) admixing the resulting shredded solid refuse and water, forming a water-wet waste feed for aerobic digestion,
    (e) feeding the resulting water-wet waste feed of step (d) to an aerobic digestor,
    (f) digesting said waste feed in said aerobic digestor producing crude humus product comprising humus, and non-digestible waste feed comprising organic and inorganic non-digestibles,
    (g) separating the humus from the non-digestible waste feed,
    (h) recovering the humus from step (g),
    (i) subjecting the non-digestible waste feed from step (g) to pyrolysis, and
    (j) recovering useful products comprising combustible gases, liquid hydrocarbons, oils and tars, and carbon from pyrolysis of the non-digestible waste feed.

2. The process of claim 1 wherein sanitary sewage sludge is admixed with the shredded solid refuse of step (d) forming a water-wet waste feed.

3. A process for reclamation of useful products from domestic solid refuse comprising paper, garbage, plastics, rubber, glass, ferrous metals and non-ferrous metals, and industrial solid refuse, said process comprising:
    (a) receiving said domestic solid refuse comprising an admixture of digestible and non-digestible wastes and an industrial refuse consisting essentially of non-digestible solid wastes,
    (b) separately shredding the domestic and industrial wastes,
    (c) passing each of the domestic and industrial wastes through a magnetic separator for removal of ferrous metals from said wastes,
    (d) admixing the resulting domestic waste of step (c) and water forming a water-wet waste feed for aerobic digestor,
    (e) feeding the resulting waste feed of step (d) to an aerobic digestor,
    (f) digesting said waste feed in said aerobic digestor producing an admixture of crude humus comprising humus, and non-digestible materials comprising organic and inorganic non-digestibles,
    (g) separating the humus from the non-digestible waste feed,
    (h) recovering the humus from step (g),
    (i) commingling the non-digestible wastes from step (g) and the industrial waste of step (c) and pyrolyzing said waste mixture, and
    (j) recovering useful products comprising combustible gases, liquid hydrocarbons, oils and tars and carbon from said pyrolysis.

4. The process of claim 3 wherein sanitary sewage sludge is admixed with the shredded solid refuse of step (d) forming a water-wet waste feed.

5. A reclamation system for recovery of useful products from domestic solid refuse, said system comprising:
    (a) refuse shredding apparatus,
    (b) means for conveying domestic solid refuse into the shredding apparatus,
    (c) magnetic separation apparatus,
    (d) means for conveying shredded refuse through the magnetic separation apparatus,
    (e) refuse pulping apparatus,
    (f) means for conveying shredded refuse into said pulping apparatus,
    (g) aerobic digestion apparatus,
    (h) means for conveying pulped refuse into said aerobic digestion apparatus,
    (i) means for conveying digested refuse comprising crude humus out of said digestor into a separation apparatus,
    (j) separation apparatus for separating said crude humus into a first fraction comprising humus and into a second fraction comprising non-digestible refuse,
    (k) a pyrolysis furnace means, and
    (l) means for conveying the non-digestible refuse of step (j) into said pyrolysis furnace means.

6. A reclamation system for recovery of useful products from domestic and industrial solid refuse, said system comprising:
    (a) a refuse shredding apparatus,
    (b) means for separately conveying domestic and industrial waste through the refuse shredding apparatus,
    (c) a magnetic separation apparatus,
    (d) means for separately conveying domestic and industrial waste through the magnetic separation apparatus,
    (e) a domestic refuse pulping apparatus,
    (f) means for conveying shredded domestic refuse of step (d) into said pulping apparatus,
    (g) an aerobic digestion apparatus,
    (h) means for conveying pulped domestic refuse into said aerobic digestor,
    (i) means for conveying digested domestic refuse comprising crude humus out of said digestor into the separation apparatus,
    (j) separation apparatus for separating said crude humus into a first fraction comprising humus and into a second fraction comprising non-digestible refuse,
    (k) a pyrolysis furnace means, and
    (l) means for conveying the non-digestible refuse of step (j) and the industrial refuse of step (d) into said pyrolysis furnace means.

References Cited
UNITED STATES PATENTS

| | | | |
|---|---|---|---|
| 3,236,604 | 2/1966 | Pierson | 23—259.1 |
| 3,579,320 | 5/1971 | Pesses | 71—9 |
| 3,236,605 | 2/1966 | Pierson | 23—259.1 |
| 3,142,557 | 7/1964 | MacDuffie et al. | 23—259.1 X |

JOSEPH SCOVRONEK, Primary Examiner

U.S. Cl. X.R.

23—209.4, 259.1; 48—209; 71—9; 201—25, 31; 202—121; 208—8